M. GAFNEY.
Improvement in Stench Traps.
No. 120,427.                    Patented Oct. 31, 1871.
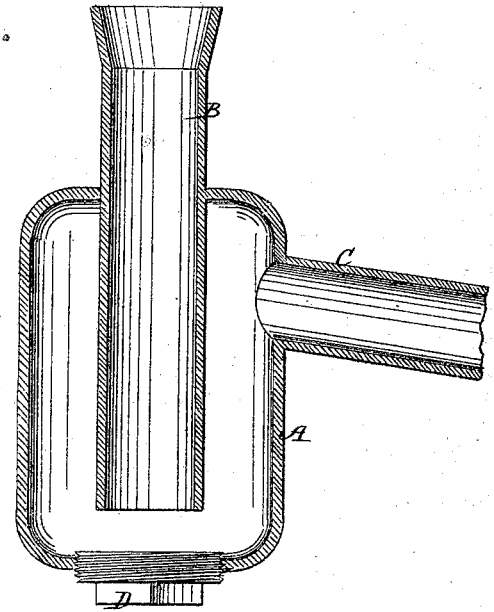

UNITED STATES PATENT OFFICE.

MICHAEL GAFNEY, OF NEWARK, NEW JERSEY.

IMPROVEMENT IN STENCH-TRAPS.

Specification forming part of Letters Patent No. 120,427, dated October 31, 1871.

*To all whom it may concern:*

Be it known that I, MICHAEL GAFNEY, of Newark, in the county of Essex and State of New Jersey, have invented a new and Improved Stench-Trap; and I do hereby declare that the following is a full, clear, and exact description thereof, which will enable others skilled in the art to make and use the same, reference being had to the accompanying drawing forming part of this specification.

My invention relates to improvements in stench-traps; and it consists in the employment of a large vessel in connection with the pipe, made in two sections, the one leading into it extending nearly to the bottom, and the other leading from it connected near the top; and the said vessel having a large opening at the bottom for cleaning it out, said opening being closed by a plug. The object of the said improvement is to have a large trap in which all the grease will condense and be retained, instead of passing out into the pipes below and choking them up in inaccessible places, as is now the case with the small traps used in sinks, which become sufficiently heated by the quantity of warm water passing through them to maintain the grease in such a fluid state that considerable quantities are carried out into the pipes below.

The drawing is a sectional elevation of my improved trap.

While the common traps now in use are serviceable for preventing the stench from rising up from the pipes below they do not prevent the grease from passing over into the pipes in a fluid condition and choking them up. I therefore propose to substitute for such traps, which are formed of a single tube, traps consisting of a large receiving-vessel, A, and the waste-pipe formed in two sections, B and C, the one B leading from the sink into the vessel A and extending nearly to the bottom, and the one C leading out of the vessel near to the top, to prevent the water-level in said vessel falling below the mouth of section B. In the bottom of said vessel A I make a large opening for cleaning it out from time to time, and close it with a plug, D. This large vessel A will not only hold the accumulation of grease for a long time, but, being large, will not be raised to such a temperature by the quantity of warm water ordinarily escaping from a kitchen sink as to keep the grease fluid enough to flow away with the water, but will cause it to collect and harden upon the tube B and its own walls. Although the deposit of grease may rise much higher than the bottom of pipe B, the escape of the water will not be prevented, for it will maintain a passage up through the grease to the escape-pipe C.

Having thus described my invention, I claim as new and desire to secure by Letters Patent—

A stench-trap, composed of the large vessel A and the sections of pipe B and C, the said vessel being provided with an opening in the bottom for cleaning it out, and a stopper, D, therefor, substantially as specified.

The above specification of my invention signed by me this 9th day of August, 1871.

MICHAEL GAFNEY.

Witnesses:
GEO. W. MABEE,
T. B. MOSHER.

(8)